United States Patent [19]
Chichester et al.

[11] 3,910,369
[45] Oct. 7, 1975

[54] HYDROSTATIC TRANSMISSION SYSTEM FOR ARTICULATED VEHICLE

[75] Inventors: Willard L. Chichester; Donald A. Holtkamp, both of Battle Creek, Mich.

[73] Assignee: Clark Equipment Company, Buchanan, Mich.

[22] Filed: Apr. 12, 1974

[21] Appl. No.: 460,660

[52] U.S. Cl. ............... 180/44 F; 180/66 R; 91/412; 180/79.2 B
[51] Int. Cl.² ........................................ B60K 17/34
[58] Field of Search ........ 180/44 F, 44 R, 66 R, 49, 180/79.2 B; 91/412; 137/109, 110

[56] References Cited
UNITED STATES PATENTS

| | | | |
|---|---|---|---|
| 2,833,362 | 5/1958 | Martin | 180/66 R |
| 3,129,781 | 4/1964 | Stein | 180/44 F |
| 3,151,694 | 10/1964 | Rogers | 180/66 R X |
| 3,256,950 | 6/1966 | DeBiasi | 180/44 F |
| 3,351,147 | 11/1967 | Williamson | 180/44 F X |
| 3,506,081 | 4/1970 | Rumsey | 180/66 R |
| 3,590,688 | 7/1971 | Brannon | 91/412 |
| 3,714,999 | 2/1973 | Fletcher | 180/66 R |

*Primary Examiner*—Kenneth H. Betts
*Attorney, Agent, or Firm*—John C. Wiessler

[57] ABSTRACT

A hydrostatic transmission drive system for an articulated vehicle in which an operator controlled reversible variable displacement pump effects through flow divider means positive traction at one wheel under full pump pressure irrespective of a loss of traction on any other wheel, such that during straightahead steering each drive wheel operates continuously at a fixed proportion of total fluid volume and at pump discharge pressure. During articulation of the vehicle for steering the flow is proportionalized to the inside and outside wheels to effect differential wheel speeds at front and rear pairs thereof as required for non-scrub steering at all available steering angles. under particularly adverse circumstances, such as deep mud, the vehicle is capable of "snaking" its course by zig-zag steering under traction.

5 Claims, 3 Drawing Figures

HYDROSTATIC TRANSMISSION SYSTEM FOR ARTICULATED VEHICLE

BACKGROUND OF THE INVENTION

The field of art to which the invention pertains includes hydrostatic transmission systems for vehicles.

Hydrostatic transmission systems for four-wheel drive vehicles, whether articulated or steered by more conventional means, are known, as well as systems for maintaining positive traction at one or more certain wheels irrespective of a loss of traction at one or more other wheels.

SUMMARY OF THE INVENTION

Our invention includes a hydrostatic transmission system which is capable of maintaining full circuit pressure at each of a plurality of wheels regardless of variations in traction as between the wheels, and of articulating for steering under controlled conditions in which the flow to the outer and inner wheels at any given steering angle is proportionalized as a function of the steering angle. A variable displacement supply pump and flow divider means are used which in straight-ahead operation first divides the pump output volume substantially half-and-half as between the pairs of longitudinally related wheels on opposite sides of the vehicle, and then further divides each one-half volume substantially half-and-half between the longitudinally related pair of wheels on each side of the vehicle, all at substantially pump discharge pressure and all irrespective of variations in surface traction as between any one wheel and any other wheel.

DESCRIPTION OF THE PREFERRED EMBODIMENT

Figure 1:
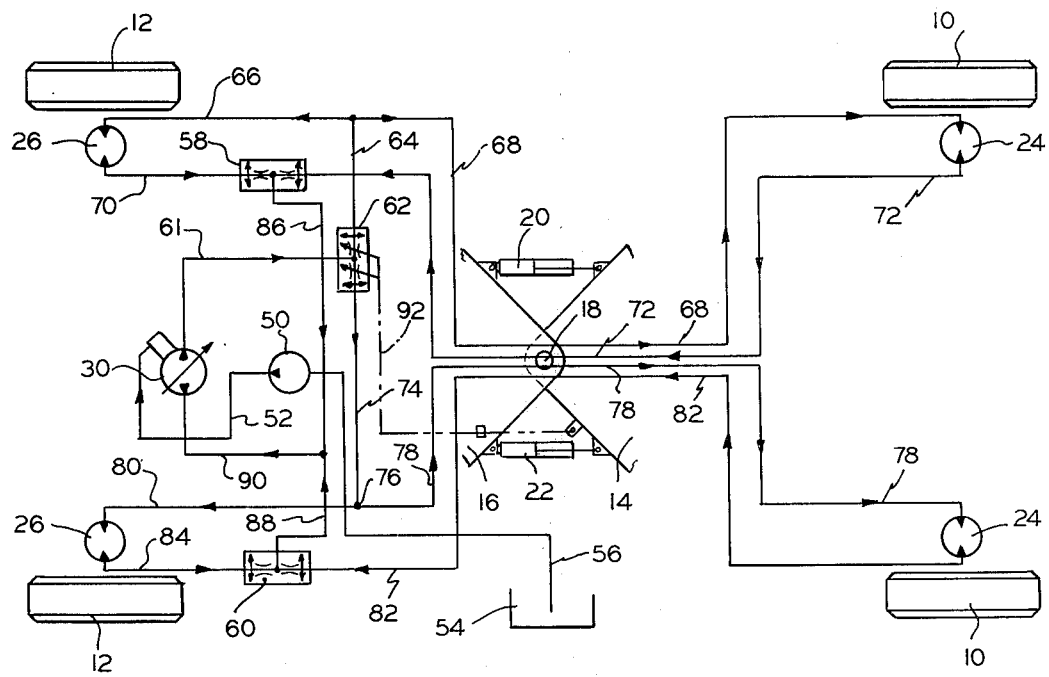
FIG. 1 is a schematic drawing of our hydrostatic transmission system.
Figure 2:
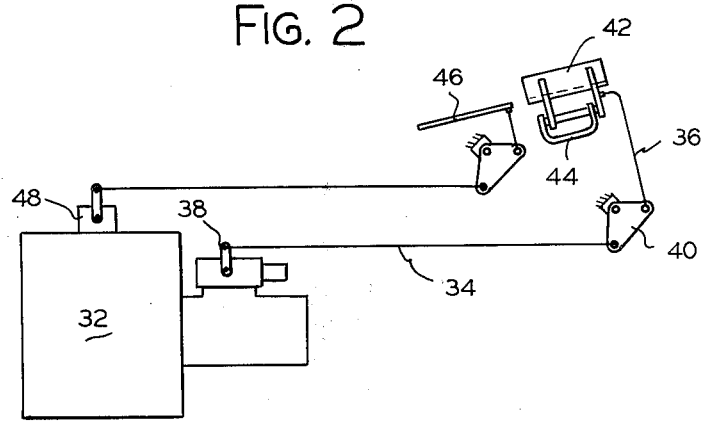
FIG. 2 is a schematic view of the vehicle engine, main pump and the operator controls therefor.
Figure 3:
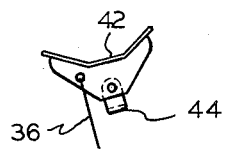
FIG. 3 is a front view of one of the operator's pump controls shown in FIG. 2.

A vehicle is represented by front and rear pairs of drive wheels 10 and 12 and by a broken-away central portion of a vehicle chassis represented at numerals 14 and 16, which portions are connected pivotally together at shaft 18 to provide an articulated vehicle. Steer cylinder assemblies 20 and 22 are each connected at the base and piston rod ends to respective ones of vehicle portions 14 and 16 and form the working components of a conventional hydraulic circuit, not shown, which includes a steering pump and operator controlled steering valve for operating the cylinder assemblies in opposed directions in order to articulate the vehicle for steering. The pairs of non-dirigible wheels 10 and 12 are adapted to be driven by pairs of reversible hydraulic motors 24 and 26, respectively, which are connected in a manner to be described to a main fluid traction drive pump 30 of a reversible variable displacement type which is driven by an engine 32 coupled thereto (FIG. 2), the camming or swash plate of the pump being directly controllable by push-pull cables and levers 34, 36, 38 and 40. A reversible operator's pedal control 42 is pivotally mounted from a bracket 44 and has a configuration such as shown for pulling and pushing cables 36 and 34 to adjust the pump for forward and reverse vehicle drive, respectively. FIG. 2 represents the control condition in the neutral or zero stroke position of the pump. An accelerator pedal 46 may be similarly connected by push-pull cables and levers, as shown, to control the engine via a carburetor 48.

A uni-directional charging pump 50 is connected to the pump 30 by a conduit 52 and is connected to a reservoir 54 by a conduit 56. The closed loop circuit of main pump 30 is connected to each of the wheel motors 24 and 26 for traction drive in either forward or reverse by way of a pair of proportional flow divider-combiners 58 and 60 and by an adjustable proportional flow divider-combiner 62, both types being manufactured by Fluid Controls, Inc., of Mentor, Ohio.

The arrowed conduits illustrate the direction of flow throughout the system in forward drive wherein pump 30 discharges into conduit 61, the flow in which is divided by halves at proportional flow divider 62 in a vehicle having front and rear wheels of equal diameter and being steered in a straight line, i.e., without articulation of vehicle portions 14 and 16. One-half of said total flow is directed into conduit 64 which connects with conduits 66 and 68, conduit 66 being connected to the left wheel motor 26 and conduit 68 to the left wheel motor 24, the return flow from both motors flowing by way of conduits 70 and 72, respectively, to be combined at unit 58 which in forward drive functions as a 50—50 flow combiner which maintains always substantially equal flow volumes through said motors 24 and 26 regardless of variations in tractive conditions at the wheels. Under the above conditions specified, therefore, one-quarter of the total fluid flowing flows through each of said wheel motors. Likewise, under the conditions assumed, one-half of the total flow is directed by unit 62 into a conduit 74 and further divides at connection 76, flowing in opposite directions through conduits 78 and 80 to front and rear right-hand wheel motors 24 and 26, the division of flow between the motors being controlled by unit 60 which is connected to said wheel motors by conduits 82 and 84 and which functions in forward drive as a flow combiner the same as unit 58. Return flow to unit 58 is combined in conduit 86 and return flow to unit 60 is combined in conduit 88, which conduits connect to a conduit 90 which conveys the total flow back to the inlet of pump 30 in the closed loop drive circuit hereof.

In reverse drive, the pump 30 discharges pressure fluid in a reverse direction by manipulation of foot pedal 42 in an opposite direction which reverses the traction drive at each of the wheels, in which mode under other vehicle operating conditions as above specified for forward drive, a reversal of flow in the system occurs from that above described such that units 58 and 60 function as 50—50 flow dividers, the flow dividers each receiving one-half of the total flow by way of conduits 86 and 86 and each dividing further by halves to drive the respective motors as previously but in a reverse direction. The return flow to adjustable unit 62, which functions as a flow combiner in reverse drive, proceeds by way of the various conduits previously described to combine the total return flow in conduits 64 and 74 at unit 62 which returns the same to the pump inlet by way of conduit 61.

When steering of the vehicle is required cylinder assemblies 20 and 22 are pressurized to actuate in opposite directions for causing the vehicle to articulate about main pivot shaft 18, vehicle portion 14 being connected to adjustable flow divider-combiner 62 by way of a push-pull cable 92 for adjusting the division or combination of flow from or to unit 62, depending upon the direction of vehicle drive, so as to adjust the fluid volume directed to the front and rear wheel motors on one side of the vehicle and directed to the front and rear wheel motors on the other side of the vehicle in proportion to the steering angle, thus maintaining full traction drive at all wheels under normal tractive conditions without skidding or scrubbing since the wheel speed differential between the outside and inside wheels is adjusted in proportion to the degree of vehicle articulation as required to maintain such traction. It will be noted that the only power train connections between the articulated ends of the vehicle are hydraulic hoses, which substantially simplifies the manner of transmitting power to the front wheels in such vehicles.

In practice such refinements as check valve controlled anti-cavitation circuits are provided in parallel circuit with the various flow divider-combiners and with the wheel motors, and a leakage circuit connects each wheel motor to the reservoir. Such circuits are conventional and have not been shown herein.

In operation, our system functions in an extremely novel manner in that each wheel motor drives its respective wheel in traction independently of each other wheel motor and at full pump pressure. In prior series drive hydrostatic motor systems, such as in U.S. Pat. No. 3,351,147, or in vehicles steered by articulation with hydrostatic drive as in Rogers U.S. Pat. No. 3,151,694, no such result was possible, particularly as regards articulated steering with full traction and wheel speed differentiation at all wheels. In U.S. Pat. No. 3,351,147, for example, instead of having full pump output available at each wheel motor in series, only one-quarter of pump output is available at any given motor. It is to be emphasized that by the relatively simple, but extremely unique manner of utilizing flow divider-combiner elements, or their equivalent, in a four-wheel drive closed loop hydrostatic drive circuit with full variable displacement pump control in either driving direction, that full pump output torque is available under all road conditions at each wheel, irrespective of variations in surface tractive conditions as between the wheels.

It will be apparent that the three flow divider-combiners 58, 60 and 62 are so located in the drive circuit as to cooperate in any driving mode to limit the volume flow to any wheel motor at pump output pressure so that it does not exceed the volume flow at its counterpart wheel motor on the same side of the vehicle when the vehicle is being steered, or at any of the other motors when the vehicle is driving straight ahead. Full wheel motor torque is therefore available at each wheel motor at any given engine speed and pump displacement for maximizing vehicle response and operator control. In other words, our system combines the best features of both in-series and in-parallel systems, while eliminating the worst features of both.

It is a further particular advantage that under extremely poor tractive conditions, such as if the vehicle is operating in deep mud, that our transmission system is capable of driving the vehicle to negotiate by snaking through the terrain; i.e., zig-zag turning control by the operator effects full tractive drive as all wheels turn under full differential speed control and available traction to drive the vehicle through such conditions of terrain.

Although we have disclosed only one embodiment of our invention, it will be understood that the invention is not limited to the specific embodiment shown, but may be used in various other ways, and various modifications may be made to suit different requirements, and that other changes, substitutions, additions and omissions may be made in the construction, arrangement and manner of operation without necessarily departing from the scope of the invention. For instance, front and rear wheels may differ in diameter, in which instance the flow divider-combiner units 58 and 60 are modified to divide that volume of the total fluid flowing so that each wheel will be driven to travel the same circumferential distance in the same period of time as each other wheel under conditions of full traction at all wheels and straight line steering. Also, a vehicle utilizing the invention may have any number of wheels in multiples of two or three. In a three-wheeled vehicle, for example, the third wheel motor would receive one-third of the total flow. A tracked vehicle may be substituted for a wheeled vehicle, in which case wheel motors would be adapted to drive cog wheel engaging tracks, for example, with equivalent results as herein disclosed in respect of a wheeled vehicle. Such obvious variations are merely exemplary, and we do not intend to be limited except as the invention is defined in the following claims.

We claim:

1. In a hydrostatic power transmission system for a four-wheel drive articulated vehicle having first and second pairs of longitudinally spaced drive wheels and first and second pairs of hydraulic motors for driving respective pairs of said wheels, a fluid drive system comprising a closed loop drive circuit connecting said pairs of hydraulic motors including an engine driven variable displacement pump means, operator control means for controlling said engine and pump, and other control means in said drive circuit operatively connecting said pump to each of said motors including a main fluid flow divider means for dividing continuously in straight-ahead operation of the vehicle the fluid discharge of said pump means by volume substantially one-half each to said first and second pairs of motors at substantially pump discharge pressure, a first fluid flow divider means for dividing continuously under all conditions of straight-ahead vehicle operation the said first one-half fluid volume between the motors of said first pair of motors in a predetermined fixed proportion by volume and at substantially pump discharge pressure, and a second fluid flow divider means for dividing continuously under all conditions of straight-ahead vehicle operation the said second one-half fluid volume between the motors of said second pair of motors in a predetermined fixed proportion by volume and at substantially pump discharge pressure, whereby each drive wheel operates continuously for straight-ahead vehicle operation at a predetermined substantially fixed proportion of total fluid volume and substantially at pump discharge pressure irrespective of variations in surface traction as between any one of said wheels and any other wheel.

2. A hydrostatic transmission system as claimed in claim 1 wherein said other control means connects said first and second pairs of motors for operation in series, and further connects the motors of said pair in series.

3. A hydrostatic transmission system as claimed in claim 1 wherein the vehicle is articulated for steering about a vertical axis, said main flow divider means being responsive to the steering angle between articulated sections of the vehicle for increasing the volume fluid flow to the pair of motors of the outside wheels of said first and second pairs of wheels above said, one-half volume an amount which is proportional to the steering angle and for decreasing the volume fluid flow to the pair of motors of the inside wheels below said one-half volume an amount which is proportional to steering angle to differentiate the wheel speeds of the inside and outside pairs of wheels as a function of the steering angle.

4. A hydrostatic transmission system as claimed in claim 3 wherein articulating the vehicle in a zig-zag pattern for steering effects vehicle drive by rotary traction driving under continuous series operation of said first and second motors at said pump discharge pressure.

5. A hydrostatic transmission system as claimed in claim 1 wherein said variable displacement pump and said motors are reversible to operate the vehicle in a reverse direction, said main and first and second flow divider means functioning also as flow divider means as aforesaid during operation of said pump and motors in a reverse direction.

* * * * *